(12) United States Patent
Stemple et al.

(10) Patent No.: US 8,452,713 B2
(45) Date of Patent: May 28, 2013

(54) COMPUTERIZED SYSTEM AND METHOD FOR MATCHING FREIGHT VEHICLES AND LOADS

(75) Inventors: Robert William Stemple, Midland, MI (US); Brian Scott Foulds, Bay City, MI (US); Gary Lew Short, Freeland, MI (US)

(73) Assignee: Transit Solutions, LLC, Bay City, MI (US)

( * ) Notice: Subject to any disclaimer, the term of this patent is extended or adjusted under 35 U.S.C. 154(b) by 91 days.

(21) Appl. No.: 13/026,894

(22) Filed: Feb. 14, 2011

(65) Prior Publication Data

US 2012/0209787 A1 Aug. 16, 2012

(51) Int. Cl.
*G06Q 30/00* (2012.01)
*G08G 1/123* (2006.01)
(52) U.S. Cl.
USPC ............................ 705/333; 340/990; 340/988
(58) Field of Classification Search
USPC ............. 705/13, 7.11–7.26, 28–30, 330–341, 705/6, 7.13, 7.12; 340/988–995.28, 990, 340/539.13; 235/384, 385; 701/468, 516, 701/517; 715/764
See application file for complete search history.

(56) References Cited

U.S. PATENT DOCUMENTS

| | | | |
|---|---|---|---|
| 5,131,020 A | 7/1992 | Liebesny et al. | |
| 5,519,621 A | 5/1996 | Wortham | |
| 5,959,577 A | 9/1999 | Fan et al. | |
| 5,963,129 A | 10/1999 | Warner | |
| 6,687,609 B2 * | 2/2004 | Hsiao et al. | 701/517 |
| 6,697,735 B2 * | 2/2004 | Doyle | 701/468 |
| 7,246,009 B2 | 7/2007 | Hamblen et al. | |
| 7,319,412 B1 | 1/2008 | Coppinger et al. | |
| 7,385,500 B2 | 6/2008 | Irwin | |
| 7,688,185 B1 * | 3/2010 | McKethan | 340/431 |
| 2002/0057212 A1 | 5/2002 | Hamilton et al. | |
| 2008/0097812 A1 * | 4/2008 | Davis | 705/8 |
| 2009/0030770 A1 | 1/2009 | Hersh et al. | |
| 2009/0094084 A1 * | 4/2009 | Rempel et al. | 705/8 |

* cited by examiner

*Primary Examiner* — Igor Borissov
(74) *Attorney, Agent, or Firm* — Howard & Howard Attorneys PLLC (57) ABSTRACT

A system for matching freight vehicles and loads includes a database receiving location data for various freight vehicles associated with multiple organizations, as well as other vehicle data, such as destination location and times. The database also includes location data from a plurality of loads, as well as other load data, such as origin and destination locations and times. A user operating a computing device receives this data based on organizational permissions. The computing device displays a map on which the various freight vehicles, loads, and associated data may be displayed. As such, the user may quickly and efficiently match available loads to available vehicles or vice-versa.

20 Claims, 7 Drawing Sheets

COMPUTERIZED SYSTEM AND METHOD FOR MATCHING FREIGHT VEHICLES AND LOADS

BACKGROUND OF THE INVENTION

1. Field of the Invention

The subject invention relates generally to computer systems and associated methods for matching vehicles and freight to be transported by the vehicles.

2. Description of the Related Art

The trucking industry is often wrought with waste and inefficiency. One such inefficiency is the common problem of moving empty or under capacity trailers after a freight load has been delivered. Clearly, by transporting empty trailers, fuel is wasted which, of course, results in higher costs to the shippers and shipping companies.

One solution to this inefficiency is the practice of backhauling, i.e., picking up a second load at or near where a first load is dropped off. However, with a large number of different trucking companies and other organizations in the marketplace, the existence of an available load is difficult and often impossible to determine. While some "backhaul brokers" do operate in the marketplace, such brokers typically utilize a manual approach add an additional cost to the marketplace.

As such, there is an opportunity for a computerized system and method to efficiently assist in matching freight vehicles and loads.

BRIEF SUMMARY

The subject application discloses a system and associated method for matching freight vehicles and loads. The system includes a database for receiving location data from a plurality of global positioning system (GPS) receivers wherein each GPS receiver is coupled to one of the freight vehicles. The database includes a plurality of organization labels wherein each organization label corresponds to an organization and wherein at least one of the organization labels is associated with each of the freight vehicles and each of the loads. The database also includes a vehicle visibility tag associated with each freight vehicle to denote whether each freight truck is visible to either only the organization associated with the freight truck or the organization associated with the freight truck and at least one additional organization. The database further includes a load visibility tag associated with each load to denote whether each load is visible to either only the organization associated with the load or the organization associated with the load and at least one additional organization. The system also includes a plurality of computing devices in communication with the database. Each of the computing devices includes a display and transmits an identification to the database associated with at least one of the organization labels. The database transmits a current location of each truck and a current location of each load to each of the computing devices in accordance with the visibility tags associated with the at least one organization label that is associated with the identification transmitted from each of the computing devices. The computing device displays a map including the location of each freight truck and load transmitted to the computing device from the database.

The system and method provide several advantages over the prior art. Specifically, a user utilizing the system or method is able to quickly and reliably find an available load for an available vehicle to transport. This promotes efficiency in potentially preventing empty trailers from being transported back-and-forth. Similarly, the user using the system or method is able to quickly find an available vehicle to pick-up and deliver a load.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a system 10 for matching freight vehicles V and loads L is shown herein. In the illustrated embodiment, each freight vehicle V is a land-based truck and may comprise a power element P and a trailer element T. Those skilled in the art realize that the power element P is commonly referred to as a cab or a tractor. However, those skilled in the art realize that the freight vehicle V may alternatively be an aircraft, ship, train, or other suitable apparatus for moving a load L. Furthermore, those skilled in the art realize that the loads L may be commonly referred to as freight, cargo, shipments, packages, and/or vehicles being transported.

Figure 1:
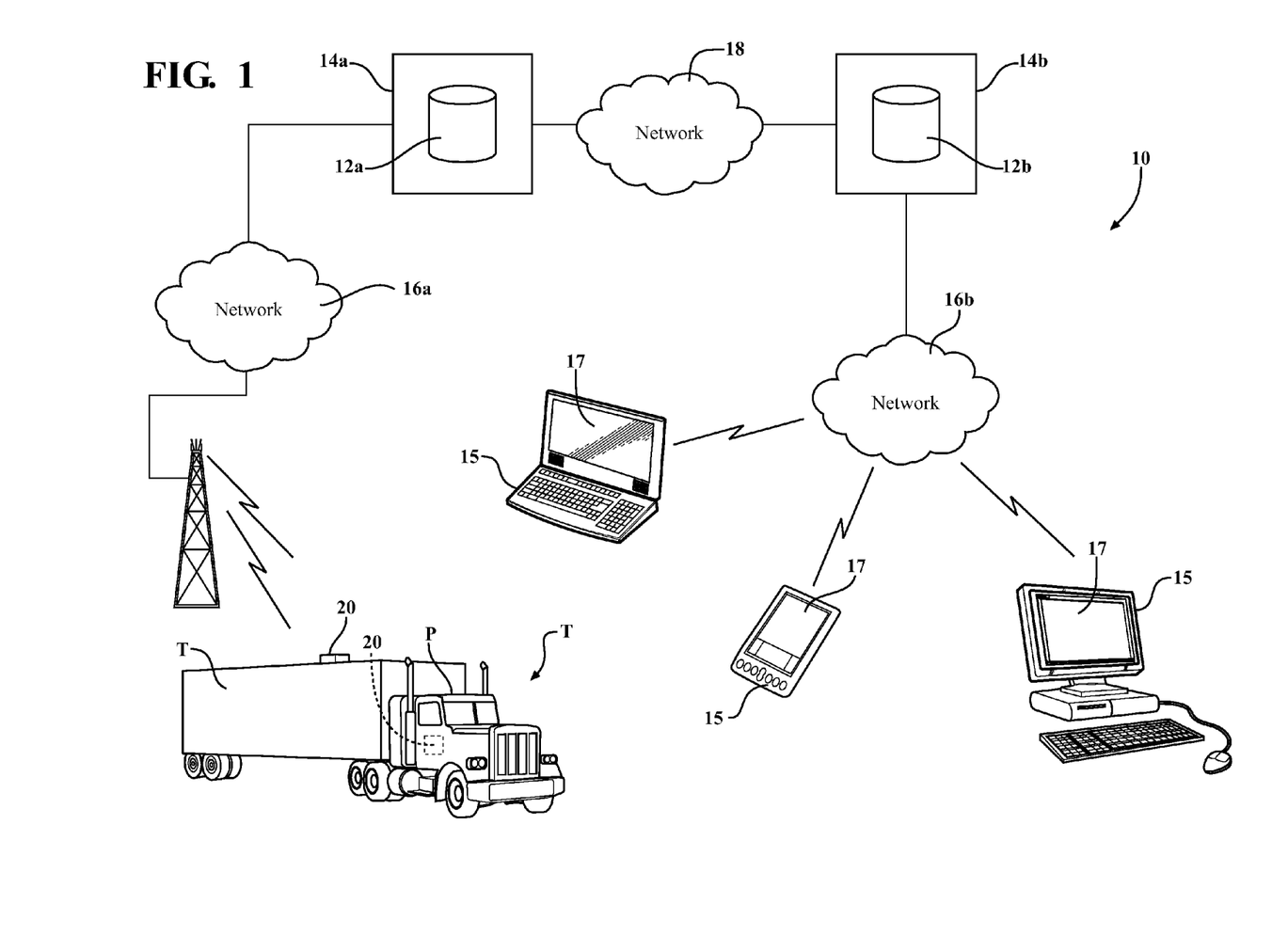
FIG. 1 is a block diagram showing one embodiment of a system for matching freight vehicles and loads.

Referring to FIG. 1, the system 10 includes a database 12 for receiving, storing, and sending data. Specifically, the database 12 stores data relating to the various freight vehicles V and loads L. More specifically, the database 12 stores data relating to the various power elements P, the various trailer elements T, and the various loads L. The database 12 is preferably a relational database as is well known to those skilled in the art for storing records containing various data and other information. Examples of suitable databases 12 include, but are not limited to, MySQL, Oracle, and Microsoft Access. In the illustrated embodiment, the database 12 is stored on a storage device (not shown) as part of a server computer 14. Of course, in other embodiments, the database 12 may be distributed or duplicated in more than one server computer 14, as is well known to those skilled in the art.

In the illustrated embodiment, the database 12 and the server computer 14 are implemented as a first database 12a stored on a first server computer 14a and a second database 12b stored on a second server computer 14b. The first and second server computers 14a, 14b, and accordingly, the first and second databases 12a, 12b are in communication with one another. A first network 16a may be utilized for communication between the server computers 14a, 14b. In the illustrated embodiment, certain data from the first database 12a is copied and stored in the second database 12b. However, those skilled in the art may realize other suitable techniques for transferring, copying, and/or mirroring data between the databases 12a, 12b.

Users of the system 10 typically utilize a computing device 15 to view information provided by the system 10, e.g., data from the database 12. Of course, the system 10 can support multiple computing devices 15 operating simultaneously. The computing devices 15 may also be referred to as client computers 15, as is recognized by those skilled in the art. Each computing device 15 is in communication with the server computer 14, and as such, the database 12 via a network 16. Specifically, in the illustrated embodiment, the second database 12b is in communication with the computing devices 15 via a second network 16b. Those skilled in the art realize many suitable implementations of the second network 16b to facilitate communication between the computing devices 15 and the database 12. For instance, the second network 16b may be the global system of interconnected networks known as the Internet.

The computing devices 15 may be of any type known to those skilled in the art, such as desktop computers, laptop computers, notebooks, smartphones, personal digital assistants (PDAs), and tablet computers. Each computing device 15 includes at least one output device (not separately numbered) for sending information to the user. In the illustrated embodiments, each computing device 15 includes a display 17 as one of the output devices. Each computing device 15 preferably includes at least one input device (not numbered), e.g., a keyboard, mouse, or touchscreen interface, for receiving information from the user.

Each computing device 15 executes or accesses a client program to access the data supplied by the database 12. Specifically, in the illustrated embodiment, the client program is executed via a web browser (e.g., Microsoft Internet Explorer, Mozilla Firefox, Google Chrome, etc.) as is well known to those skilled in the art. The client program also receives input from the user to control presentation and modification of the data, as described in further detail herein. Each computing device 15 may display a map 19 on the display 17. Specifically, the client program generates a map 19 that is viewable by the user on the display 17 of the computing device 15 executing the client program.

The database 12 receives location data for each freight vehicle V from a plurality of global positioning system (GPS) receivers 20. Each GPS receiver 20 is disposed in one of the freight vehicles V. Specifically, GPS receivers 20 may be disposed in the power section P, the trailer section T, or both power and trailer sections P, T.

As is well known to those skilled in the art, the GPS receivers 20 compute the location of each freight vehicle V by receiving coordinated signals from multiple GPS satellites (not shown) disposed in orbit around the Earth. The GPS receiver 20 may be incorporated as part of a mobile information system (not shown), such as the OmniTRACS system manufactured by Qualcomm headquartered in San Diego, Calif. Alternatively, the GPS receiver 20 may be a smartphone (not shown) with GPS capabilities. Of course, numerous other techniques for implementing the GPS receiver 20 in the freight vehicle V will be realized by those skilled in the art.

The GPS receivers 20 are each in communication with the database 12 via a network 16. Specifically, in the illustrated embodiment, the first database 12a receives location data from the GPS receivers 18 via a third network 16a. (Of course, this location data may be transferred from the first database 12a to the second database 12b.) Those skilled in the art realize many suitable implementations of the network 16 to facilitate communication between the GPS receivers 18 and the database 12. In the illustrated embodiment, the third network 16a includes cellular telephone service(s) to wirelessly convey the location data from the GPS receivers 18. Of course, as realized by those skilled in the art, the first network 16a, the second network 16b, and the third network 16c may be the same network or group of networks or at least share resources.

The database 12 includes a plurality of organization labels (not shown). Each organization label corresponds to an organization. The organizations may be various trucking companies, different divisions in a single trucking company, a company that is shipping goods, and/or a freight consolidation company. Of course, numerous other organizations not listed herein may be identified in the database 12 with an organization label.

At least one of the organization labels is associated with each of the freight vehicles V and each of the loads L in the database 12. That is, at least one organization label is attached to each of the freight vehicle V and loads L such that the owner, operator, or responsible party for each freight vehicle V and load L can be identified. Multiple organization labels may be applied to each freight vehicle V and/or load L if necessary and desired.

Likewise, at least one of the organization labels is associated with each computing device 17. More specifically, in the illustrated embodiment, the organization label is attached to the user using a computing device 17. Each user is associated with one or more organization labels which are stored in the second database 12b. When preparing to use the system, the user will enter a username and password at the computing device 17. The computing device 17 sends the username and password to the second server 14b for verification against data in the second database 12b. As such, the computing device 17 being used becomes associated with one or more organizations.

The database 12 further includes a vehicle visibility tag (not shown) associated with each freight vehicle V. The vehicle visibility tag allows control over which users of the system 10 may view the various freight vehicle V. Specifically, the vehicle visibility tag denotes whether each freight vehicle V is visible to either only the organization associated with the freight vehicle V or the organization associated with the freight vehicle V and at least one additional organization. That is, the vehicle visibility tag denotes whether or not each freight vehicle V is visible to users of computing devices 17 of other organizations besides the organization that the freight vehicle V is associated with. In some embodiments, the vehicle visibility tag denotes whether each vehicle V is visible to either only the organization associated with the vehicle V or all organizations.

In the illustrated embodiment, if the vehicle visibility tag associated with a freight vehicle V is active, e.g., set to an "on" state, then the freight vehicle V is visible to all other organizations. As such, when selected by the user of one of the computing devices 15, the display 17 of the computing device 15 shows the location of each vehicle V having an active vehicle visibility tag.

The database 12 also includes a load visibility tag associated with each load L. The load visibility tag allows control over which users of the system 10 may view various loads L. Specifically, the load visibility tag denotes whether each load L is visible to either only the organization associated with the load L or the organization associated with the load L and at least one additional organization. In the illustrated embodiment, if the load visibility tag associated with a load L is active, e.g., set to an "on" state, then the load L is visible to all other organizations. As such, when selected by the user of one of the computing devices 15, the display 17 of the computing device 15 shows the location of each load L having an active load visibility tag.

The database 12 may also include favorite organization labels. The favorite organization labels allow certain organizations to be designated as "favorite" or "preferred" organizations with respect to one another. For instance, a first organization may designate a second organization and a third organization as favorite organizations using favorite organization labels. The system 10 is configurable to display the favorite organizations in concert with the organization of the user of the system 10. As such, the display 17 may show the vehicles V and/or loads L of the first, second, and third organization simultaneously, without showing vehicles V and/or loads L of other organizations. Furthermore, by utilizing the favorite organization labels, the system 10 may prevent other, non-preferred organizations from access to loads L that may be picked-up.

The database 12 may further include an origination location associated with each load L. The origination location denotes the geographical place that the load L originates. That is, the origination location is the place where the load L is prior to being picked up. The origination location may be a street address, latitude and longitude coordinate, city name, postal code, or other identifier or combination of identifiers as appreciated by those skilled in the art.

The database 12 may also include a destination location associated with each load L. The destination location denotes the geographical place that the load L destined to go. That is, the destination location is the place where the load L is desired to be dropped off. The destination location may be a street address, latitude and longitude coordinate, city name, postal code, or other identifier or combination of identifiers as appreciated by those skilled in the art.

The database 12 may further include a ready date associated with each load L and an availability tag associated with each load L. The availability tag denotes whether or not the load L is available for transport. That is, the availability tag indicates whether transport of the load L is desired. Furthermore, the ready date denotes the date and/or time that the load L will be ready to be picked up for transport.

In the illustrated embodiment, the origination location, destination location, and ready date for each load L is displayed on display 17 of the computing device 15 when the load L is selected by the user. The icon representing the load L has a separate color based on the status of the load L. For instance, one color may denote whether or not the availability tag is active (i.e., whether the load L is available for pickup) while another color may denote that the load L is in motion.

The database 12 transmits a current location of each vehicle V and a current location of each load L to each of the computing devices 15 in accordance with the visibility tags associated with the organization label. That is, the database 12 send the location of each vehicle V and load L if the user of the computing device 15 is authorized to see those locations, either by being associated with the organization associated with the vehicle V or load L or if the position of the vehicle V or load L is being properly shared.

The system 10 and method as described herein provides numerous advantageous features. For one, a user using the system 10 is able to quickly and reliably find an available load L for an available vehicle V to transport. For example, if a vehicle V is traveling from Detroit and dropping off a load L in St. Louis, the system 10 may be utilized to find one or more available loads L in the vicinity of St. Louis for the vehicle V to transport on the return trip back to Detroit or on a trip to some other location. This promotes efficiency in potentially preventing empty trailers T from being transported back-and-forth.

Another advantage is that a user using the system 10 is able to quickly find an available vehicle V to pick-up and deliver a load L. For example, if an organization has a load L that must be picked-up in Austin, the user may find a vehicle V that is nearby or that will soon be in the vicinity. Those skilled in the art will realize other advantages of the system 10 and method described herein.

Figure 2:
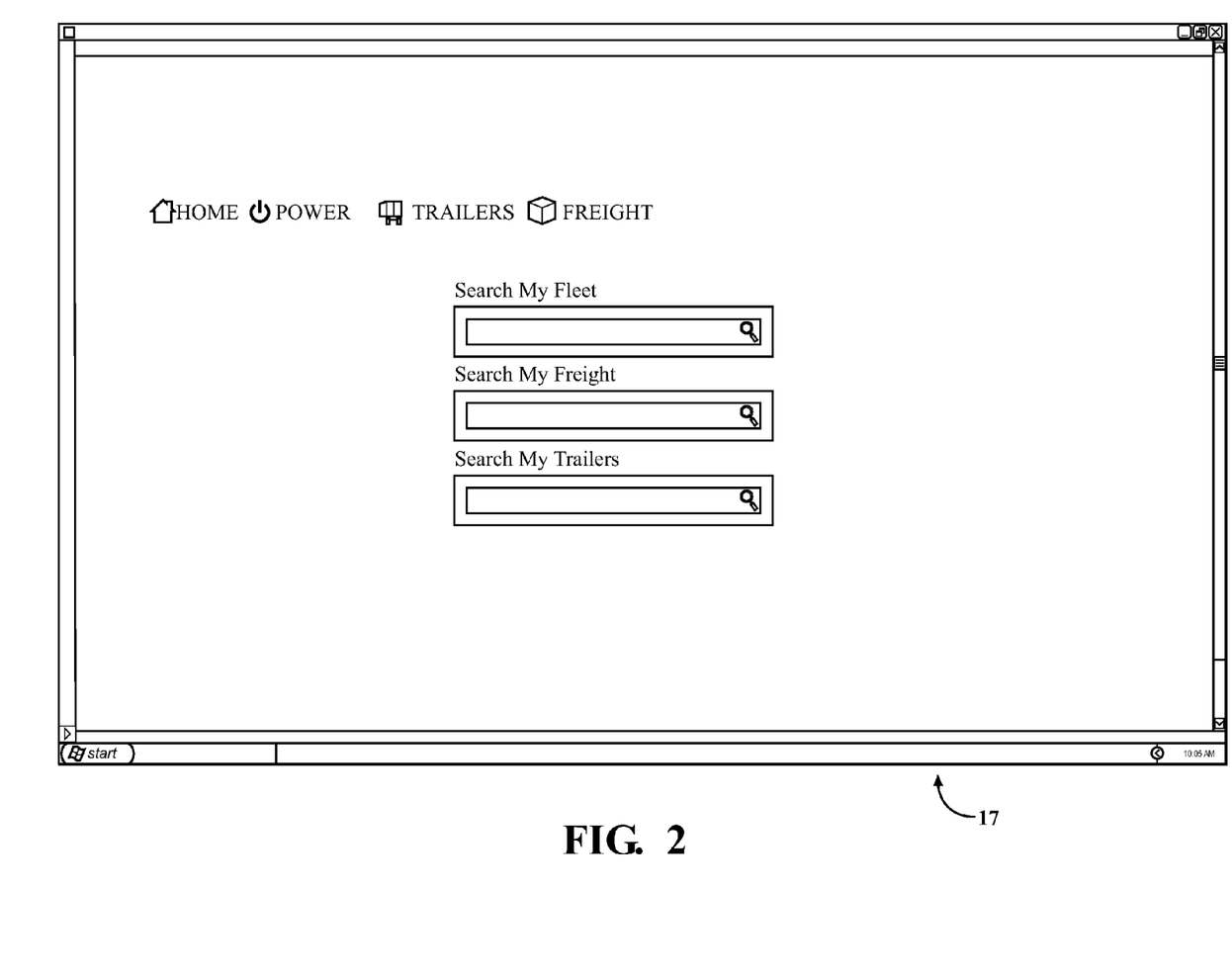
FIG. 2 is a view of a display of a computing device showing a home screen provided by a client program according to one embodiment of the system.

Operation of the system 10 of the illustrated embodiment is further explained with reference to FIGS. 2-6. As mentioned above, a user signs into the system 10 using a username and password. The username is attached to one or more organizations. After logging in, the user is presented with a home screen on the display 17, as shown in FIG. 2. From this home screen, the user is able to search for loads L, power elements P, trailer elements T, based on a unique identification number or other identifying information. (As seen in FIGS. 2-6, the loads L are labeled as "freight".) The user is also able to select power elements P, the trailer elements T, or the loads L by clicking on the appropriate icon and/or text. With any of these selections, the user is presented with a map 19 showing a geographical area and the positions of the power elements P, trailer elements T, or the loads L, dependent on the particular selection. Examples of such maps 19 are shown in FIGS. 3-7 and described further below.

In the illustrated embodiment, when the power elements P icon and/or text is selected, the user is presented with the choices of selecting either "My Fleet", "Virtual Fleet", or "Global Fleet". If "My Fleet" is selected, then only the power elements P associated with the organization associated with the user are shown. If "Virtual Fleet" is selected, then the power elements P associated with the organization associated with the user and the power elements P associated with favorite organizations are shown. If "Global Fleet" is selected, then all power elements P are shown.

In the illustrated embodiment, when the trailer elements T icon and/or text is selected, the user is presented with the choices of selecting either "My Trailers", "Virtual Trailers", or "Global Trailers". If "My Trailers" is selected, then only the trailer elements T associated with the organization associated with the user are shown. If "Virtual Trailers" is selected, then the trailer elements T associated with the organization associated with the user and the trailer elements T associated with favorite organizations are shown. If "Global Trailers" is selected, then all trailer elements T are shown.

In the illustrated embodiment, when the freight or loads L icon and/or text is selected, the user is presented with the choices of selecting either "My Freight" or "Virtual Freight". If "My Freight" is selected, then only the loads L associated with the organization associated with the user are shown. If "Virtual Freight" is selected, then the loads L associated with the organization associated with the user and the loads L associated with favorite organizations are shown.

Figure 3:
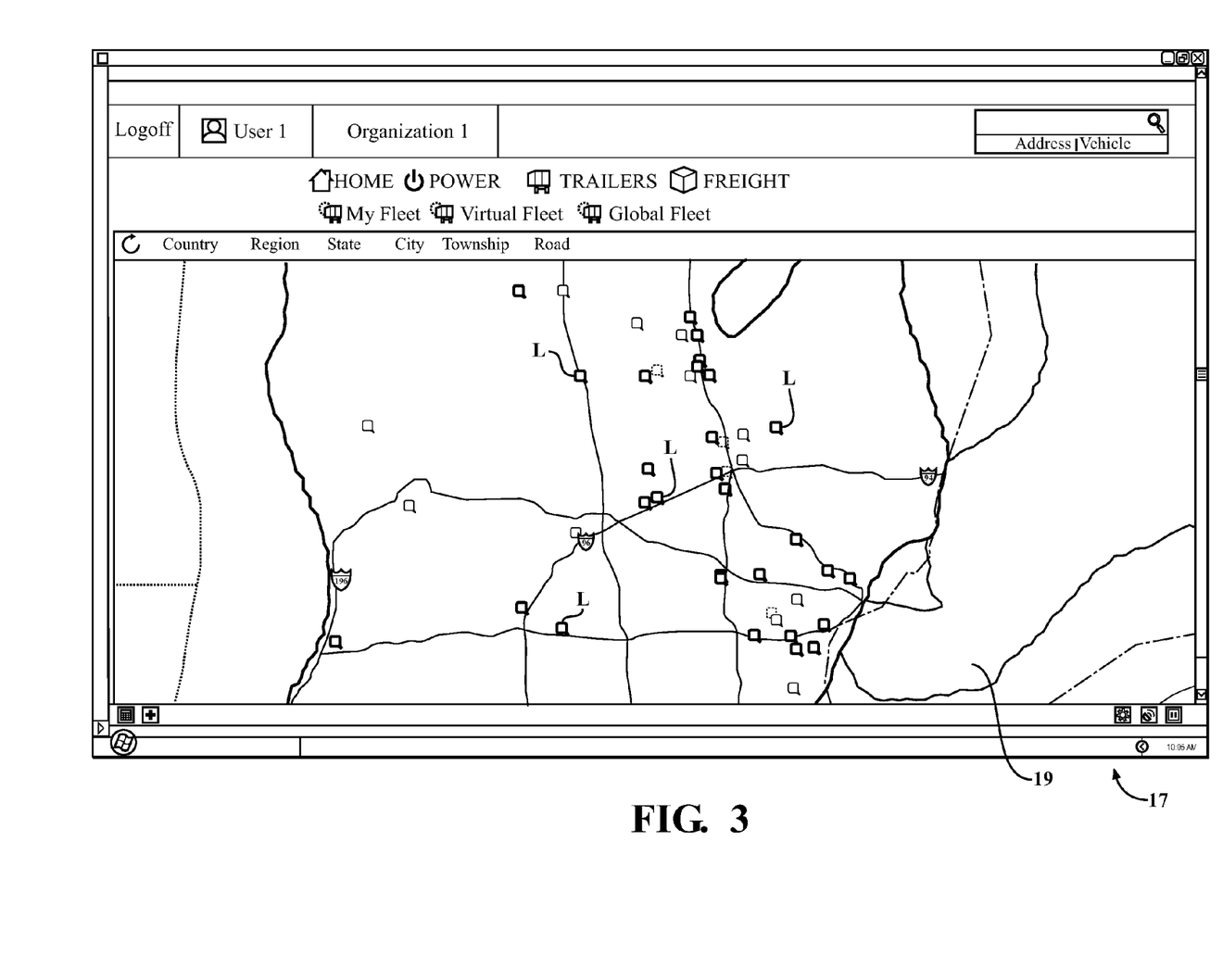
FIG. 3 is a view of the display showing a map and a plurality of loads according to one embodiment of the system.
Figure 4:
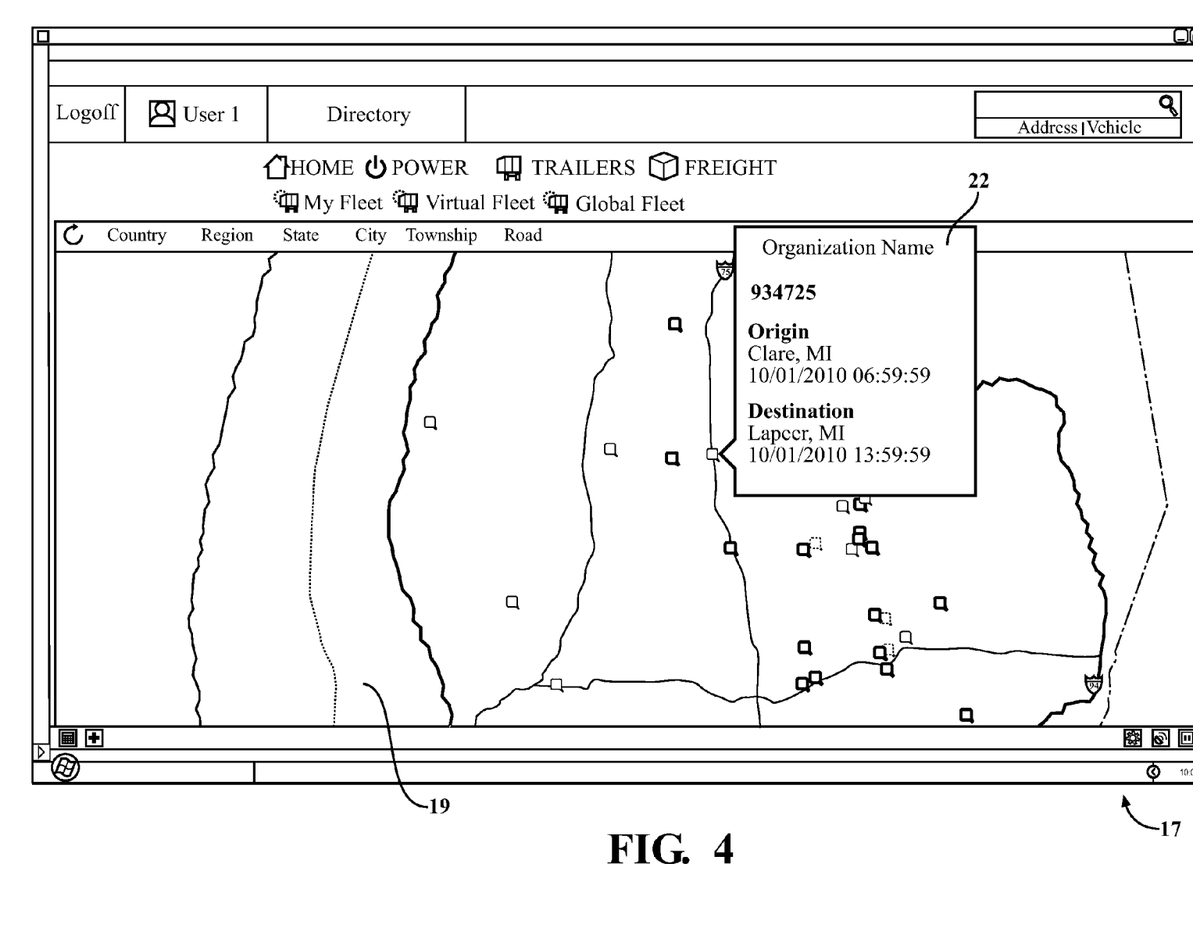
FIG. 4 is a view of the display showing the map and the plurality of modes including details of one of the plurality of loads according to one embodiment of the system.

As an example, FIG. 3 shows the map 19 after the loads L selection has been chosen. The various loads L are shown in different colors representing whether the load L is in transport, assigned to be picked up, or not assigned to be picked up. The individual loads L may be selected by the user. When an individual load L is tentatively selected by moving the mouse pointer over the load L, a dialog box 22 is opened to show details about that particular load L from the database 12, as shown in FIG. 4. The dialog box 22 shows various information about the load L, such as the organization associated with the load L, a serial number associated with the load L, the origin location of the load L, the time the load L is available to be picked up, the destination for the load L, and the time the load L is expected to be delivered.

Figure 5:
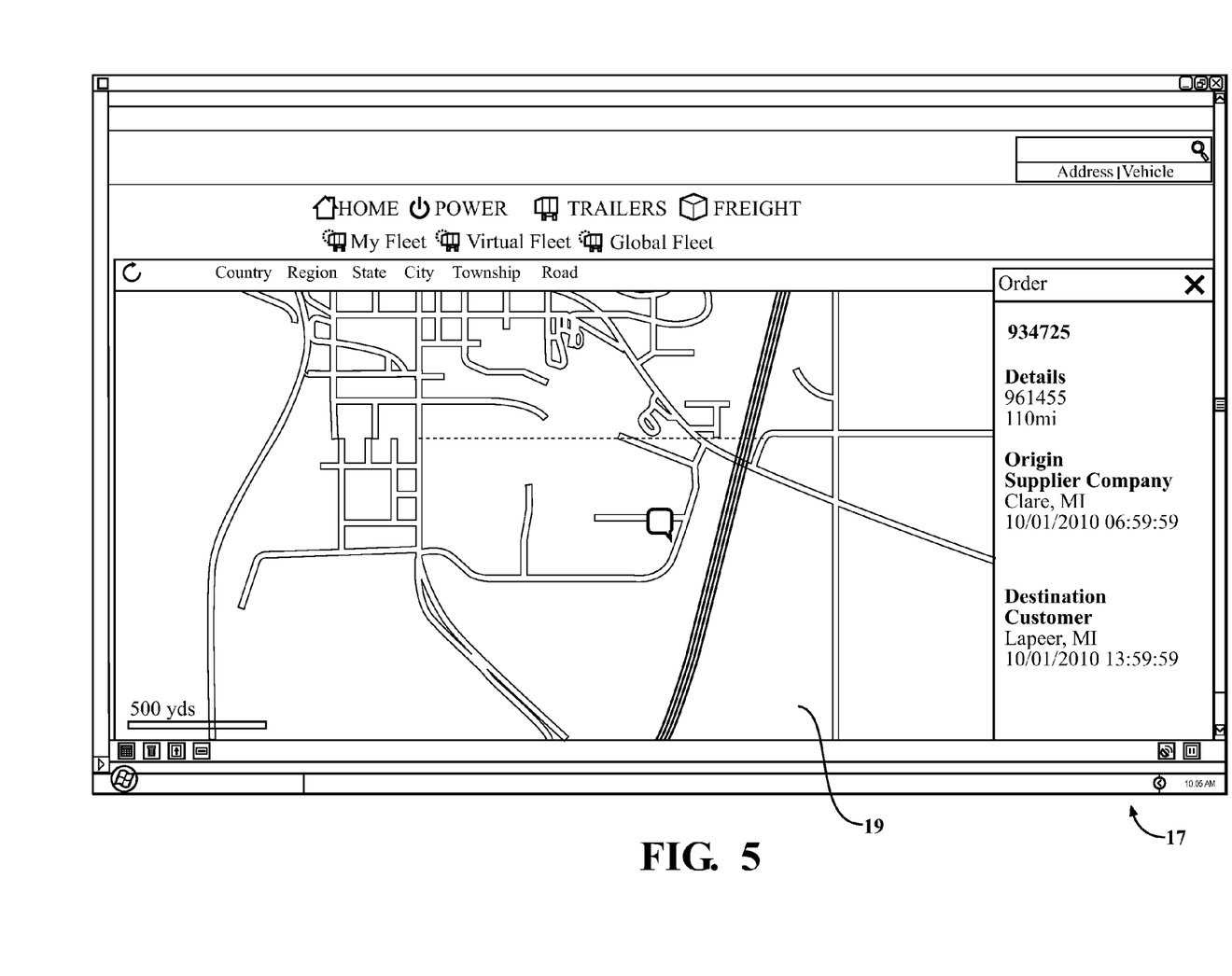
FIG. 5 is a view of the display showing a close-up view of the map and a selected load including details of the selected load according to one embodiment of the system.

When an individual load L is specifically selected by "clicking" on the load L with the mouse, the map 19 is zoomed in to show the load L and the dialog box 22 is opened, as shown in FIG. 5. On this particular screen, in the illustrated embodiment, the user is given additional options. These options are represented by icons (not numbered) positioned in the lower left hand corner of the window on the display 17.

Figure 6:
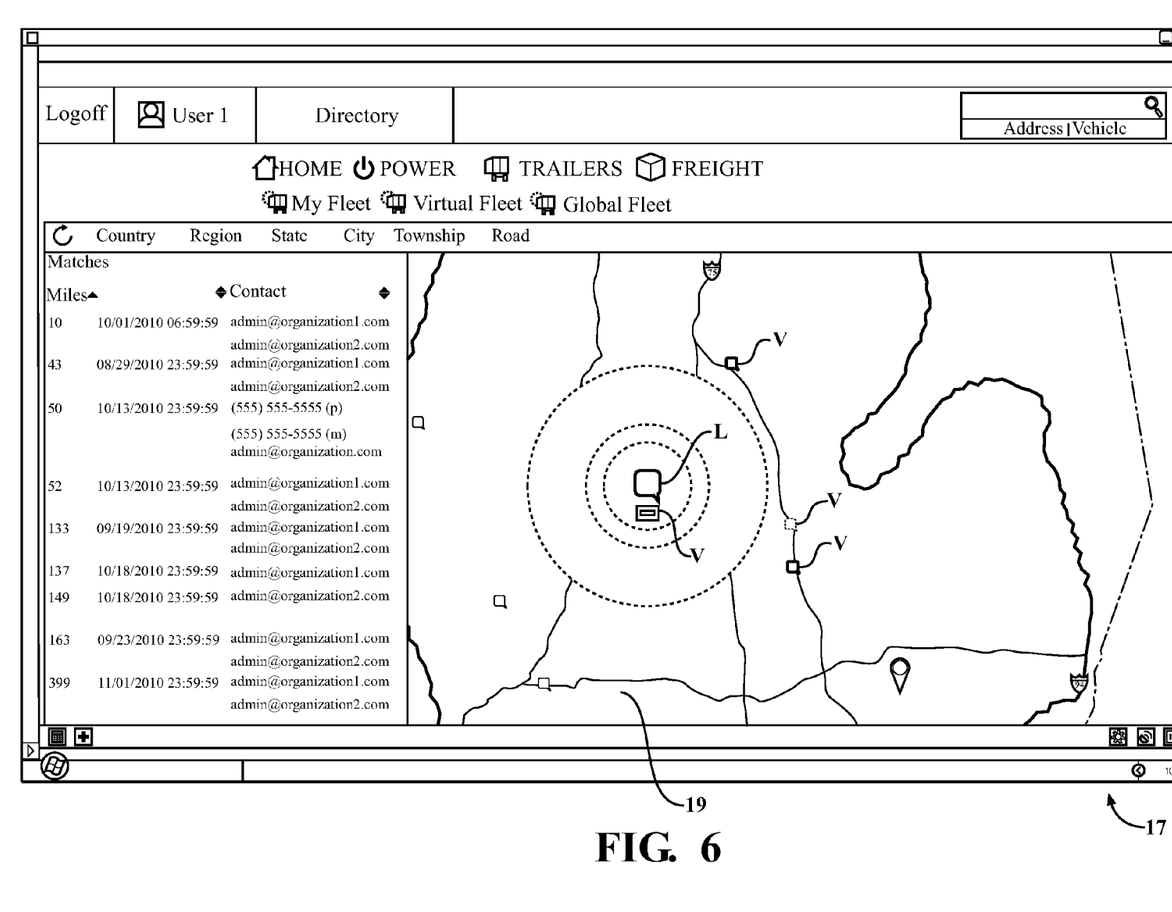
FIG. 6 is a view of the display showing the map with concentric circles disposed around the selected loads and a plurality of freight vehicles that may be available to transport the selected load.

One option presented allows the user to view the vehicles V that are located near the load L on the display 17, as shown in FIG. 6. Furthermore, when this option is selected, a plurality of circles (not numbered), concentric about the selected load L, are displayed to show various distances away from the load L. Moreover, a dialog box (not numbered) is also displayed. The dialog box shows the distance of each vehicle V away from the load L, along with contact information regarding the organization associated with each vehicle V. The user may then contact the organization associated with any of the vehicles V to arrange pickup of the load L.

The system 10 may also provide this functionality in reverse. That is, the system 10 will allow selection of one of the vehicles V on the map 19, and then show the loads L that are nearby the selected vehicle V. Of course, contact information regarding each load L may also be displayed. As such, the user may contact organizations associated the load L to arrange pickup of the load L.

Figure 7:
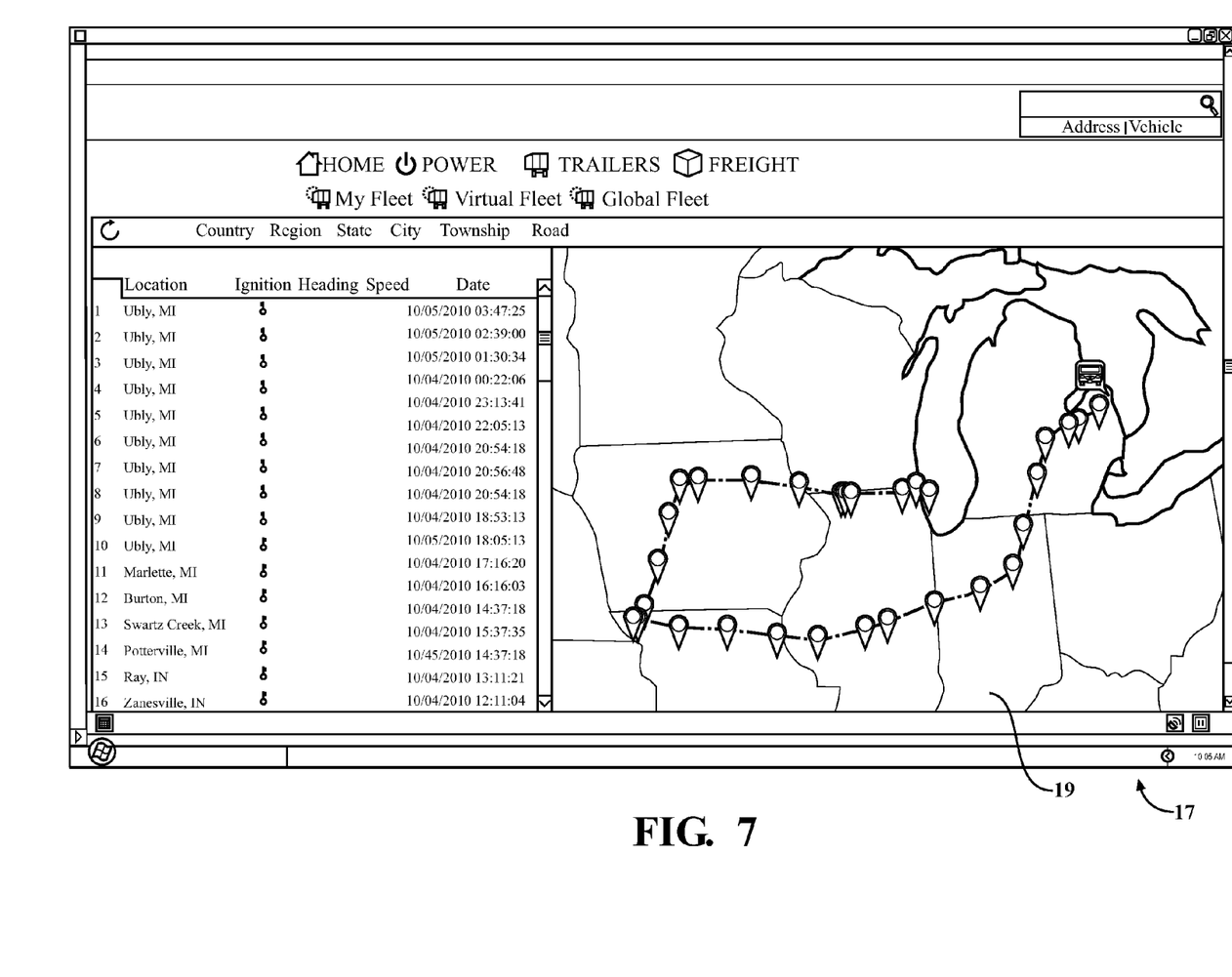
FIG. 7 is a view of the display showing the map with a path showing historical locations of a freight vehicle.

The system 10 may also provide additional useful information utilizing the various location data of the vehicles V. For example, as shown in FIG. 7, the location history for a vehicle V may be shown on the on the display 17. Specifically, the location history is shown as a track on the map 19. The user is then able to note if a vehicle V took any unauthorized detours.

The system 10 and method allow for the real-time tracking of a load L even when that load L is being transported by a vehicle V of a different organization. Said another way, when utilizing the system 10 or method, a user associated with a first organization can track a load L associated with the first organization after it has been picked up by a vehicle V associated with a second organization that is separate from the first organization. As such, the user need not consult other sources of information, e.g., the website of the second organization, to acquire an up-to-date location for the load L being transported by the second organization. This provides an important time-saving mechanism.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for matching freight vehicles and loads, said system comprising:
  a database for receiving location data from a plurality of global positioning system (GPS) receivers wherein each GPS receiver is coupled to one of the freight vehicles;
  said database including a plurality of organization labels wherein each organization label corresponds to an organization and wherein at least one of said organization labels is associated with each of the freight vehicles and each of the loads;
  said database including a vehicle visibility tag associated with each freight vehicle and denoting whether each freight vehicle is visible to either only the organization associated with the freight vehicle or the organization associated with the freight vehicle and at least one additional organization;
  said database including a load visibility tag associated with each load and denoting whether each load is visible to either only the organization associated with the load or the organization associated with the load and at least one additional organization, each vehicle visibility tag and load visibility tag being modified between a first state wherein the corresponding vehicle and load are visible to each organization and a second state wherein the corresponding vehicle and load are visible only to the organization associated with the corresponding vehicle and load;
  a plurality of client computing devices in communication with said database;
  each of said client computing devices includes a display;
  each of said client computing devices for transmitting an identification associated with at least one of the organization labels; and
  a server computer coupled the database and to each client computing device of the plurality of client computing devices, the server computer for receiving a request from at least one client computing device to transmit information associated with the freight vehicles and the loads, for identifying the organization label associated with the at least one client computing device, and for responsively transmitting information associated with each vehicle and load associated with the identified organization label, and for transmitting information associated with each vehicle and load having a visibility tag in the first state,
  the transmitted information including a current location of each freight vehicle and a current location of each load;
  said computing device for displaying a map including the location of each freight vehicle and load transmitted to said computing device from said server computer.

2. A system as set forth in claim 1 wherein said database includes an origination location associated with each load, a destination location associated with each load, a ready date associated with each load, and an availability tag associated with each load denoting whether or not the load is available for transport.

3. A system as set forth in claim 1 wherein said server computer also transmits the origination location associated with each load, the destination location associated with each load, the ready date associated with each load, and the availability tag associated with each load in accordance with the visibility tags associated with the organization label sent from each of said computing devices.

4. A system as set forth in claim 1 wherein the vehicle visibility tag denotes whether each vehicle is visible to either only the organization associated with the vehicle or all organizations.

5. A system as set forth in claim 1 wherein the load visibility tag denotes whether each load is visible to either only the organization associated with the load or all organizations.

6. A system as set forth in claim 1, the server computer for selecting a load based on a user selection input received from the client computing device, for displaying a plurality of distance markers associated with a plurality of predefined radial distances from the selected load, and for displaying the freight vehicles located within the plurality of radial distance markers.

7. A system as set forth in claim 1 wherein said server computer and/or said computing device computes the distances between one of the loads and a plurality of vehicles.

8. A system as set forth in claim 7 wherein said computing device displays the distances between one of the loads and the plurality of vehicles.

9. A system as set forth in claim 1 wherein said database is further defined as a first database and a second database in communication with one another and wherein said first database receives location data from the GPS receivers and said second database is in communication with said computing devices.

10. A method for matching freight vehicles and loads, said method comprising the steps of:
receiving, by a server computer, location data from a plurality of global positioning system (GPS) receivers wherein each GPS receiver is disposed in one of the freight vehicles;
storing the location data in a database;
storing a plurality of organization labels in the database wherein each organization label corresponds to an organization and wherein at least one of said organization labels is associated with each of the freight vehicles and each of the loads;
storing a plurality of vehicle visibility tags in a database wherein each vehicle visibility tag is associated with each freight vehicle and denotes whether each freight vehicle is visible to either only the organization associated with the freight vehicle or the organization associated with the freight vehicle and at least one additional organization;
storing a plurality of load visibility tags in a database wherein each load visibility tag is associated with each load and denotes whether each load is visible to either only the organization associated with the load or the organization associated with the load and at least one additional organization, each vehicle visibility tag and load visibility tag being modified between a first state wherein the corresponding vehicle and load are visible to each organization and a second state wherein the corresponding vehicle and load are visible only to the organization associated with the corresponding vehicle and load;
transmitting, from at least one client computing device to the server computer, a request for information associated with the freight vehicles and the loads, the request including an identification associated with at least one of the organization labels;
determining, by the server computer, the organization associated with the at least one client computing device based at least in part on the client computing device identification and the stored plurality of organization labels;
determining, utilizing the stored plurality of organization labels, each freight vehicle and load having an organization label associated with the identified organization;
transmitting, to the at least one client computing device, information associated with the freight vehicles and loads associated with the identified organization and each freight vehicle and load having a visibility tag in the first state, the information including a current location of each freight vehicle and a current location of each load from the database; and
displaying a map on a display of the client computing device including the location of each freight vehicle and load transmitted to the client computing device from the server computer.

11. A method as set forth in claim 10 further comprising the step of storing an origination location associated with each load, a destination location associated with each load, a ready date associated with each load, and an availability tag associated with each load denoting whether or not the load is available for transport in the database.

12. A method as set forth in claim 10 further comprising the step of transmitting the origination location associated with each load, the destination location associated with each load, the ready date associated with each load, and the availability tag associated with each load in accordance with the visibility tags from the database to the computing device.

13. A method as set forth in claim 10 wherein the vehicle visibility tag denotes whether each vehicle is visible to either only the organization associated with the vehicle or all organizations.

14. A method as set forth in claim 10 wherein the load visibility tag denotes whether each load is visible to either only the organization associated with the load or all organizations.

15. A method as set forth in claim 10 further comprising the step of computing the distances between one of the loads and a plurality of vehicles.

16. A method as set forth in claim 15 further comprising the step of displaying the distances between one of the loads and the plurality of vehicles.

17. A method as set forth in claim 10 wherein the database is further defined as a first database and a second database in communication with one another and wherein said step of storing the location data in the database is further defined as storing the location data in the first database.

18. A method as set forth in claim 10, further comprising the steps of:
selecting a load based on a request received from the client computing device;
displaying a plurality of radial distance markers with respect to the selected load, each distance marker associated with a predefined radial distance from the selected load; and
displaying each freight vehicle located within the plurality of radial distance markers.

19. A method as set forth in claim 10, further comprising the steps of:
generating a list of preferred organizations based on a request received from a first organization, the list of preferred organizations including at least one second organization;
receiving, from a client computing device associated with the first organization, a request to display information associated with each of the freight vehicles;
displaying a first set of freight vehicles having an organization label associated with the first organization and a second set of freight vehicles having an organization label included in the list of preferred organizations.

20. A system as set forth in claim 1, the server computer for generating a list of preferred organizations based on a request received from a first organization, the list of preferred organizations including organization labels associated with at least one second organization, for receiving, from a client computing device associated with the first organization, a request to display information associated with each of the freight vehicles, and for responsively displaying a first set of freight vehicles having an organization label associated with the first organization and a second set of freight vehicles having an organization label included in the list of preferred organizations.

* * * * *